US012492081B2

(12) United States Patent
Arend et al.

(10) Patent No.: US 12,492,081 B2
(45) Date of Patent: Dec. 9, 2025

(54) METHOD FOR POSITIONING AN ARTICLE TO BE TRANSPORTED AND DEVICE FOR CARRYING OUT THE METHOD

(71) Applicant: MULTIVAC SEPP HAGGENMUELLER SE & CO. KG, Wolfertschwenden (DE)

(72) Inventors: Christian Arend, Memmingen (DE); Tom Stachel, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 476 days.

(21) Appl. No.: 17/528,358

(22) Filed: Nov. 17, 2021

(65) Prior Publication Data

US 2022/0153531 A1    May 19, 2022

(30) Foreign Application Priority Data

Nov. 17, 2020   (DE) .......................... 102020130342.4

(51) Int. Cl.
*B26D 1/143*   (2006.01)
*B26D 5/00*    (2006.01)
*B65G 43/08*   (2006.01)

(52) U.S. Cl.
CPC ............ *B65G 43/08* (2013.01); *B26D 1/143* (2013.01); *B26D 5/007* (2013.01); *B65G 2201/0202* (2013.01); *B65G 2203/044* (2013.01)

(58) Field of Classification Search
CPC ............ B65G 2201/0202; B65G 43/08; B65G 2203/044; B26D 1/143; B26D 5/007; B26D 7/32; B26D 2210/02

(Continued)

(56) References Cited

U.S. PATENT DOCUMENTS 8,636,137 B2    1/2014  Weber
2010/0256810 A1*  10/2010  Weber .................... B65G 47/24
                                                           198/398

(Continued)

FOREIGN PATENT DOCUMENTS

DE            689 07 213 T2    9/1993
DE       10 2007 036 020 A1    2/2009

(Continued)

OTHER PUBLICATIONS

German Search Report Dated Oct. 6, 2021, Application No. 10 2020 130 342.4, Applicant Multivac Sepp Haggenmueller SE & Co. KG, 6 Pages.

(Continued)

*Primary Examiner* — Nhat Chieu Q Do
(74) *Attorney, Agent, or Firm* — BROOKS KUSHMAN P.C.

(57) ABSTRACT

A method for positioning an article in a slicing machine having a discharge unit includes detecting actual position of the article on the discharge unit by an optical unit data-connected with a control of the slicing machine, automatically comparing the actual position with a predetermined target position by the control, and in the event of a discrepancy above a predetermined acceptance value, automatically displacing the article to the target position by a part of the discharge unit on which the article rests. A transverse position of the article is changed by moving a displacement belt of the discharge unit, and a rotational position of the article is changed by driving parts of the belt at different speeds. The displacement belt is a belt conveyor with belts controllable individually and independently of one another regarding running speed and/or deflecting pulleys displaceable individually and independently of one another in a transverse direction.

5 Claims, 8 Drawing Sheets

(58) Field of Classification Search
USPC ............................................................. 83/13
See application file for complete search history.

(56) References Cited

U.S. PATENT DOCUMENTS

| | | | |
|---|---|---|---|
| 2017/0210023 A1* | 7/2017 | Hocker | .................. G01B 11/06 |
| 2018/0345520 A1 | 12/2018 | Eckhardt et al. | |
| 2020/0307916 A1 | 10/2020 | Schroeder | |
| 2021/0061576 A1* | 3/2021 | Stuhlmann | ............. B65G 43/08 |

FOREIGN PATENT DOCUMENTS

| | | |
|---|---|---|
| DE | 10 2017 112 095 A1 | 12/2018 |
| DE | 10 2017 112 137 A1 | 12/2018 |
| EP | 1 180 484 A2 | 2/2002 |
| EP | 3 715 287 A1 | 9/2020 |
| WO | 2004/000512 A1 | 12/2003 |
| WO | 2020/130823 A1 | 6/2020 |

OTHER PUBLICATIONS

European Search Report (with Partial English Machine Translation) Dated Apr. 11, 2022, Application No. 21206395.2-1103, Applicant Multivac SEPP Haggenmueller SE & Co. KG, 14 Pages.

* cited by examiner

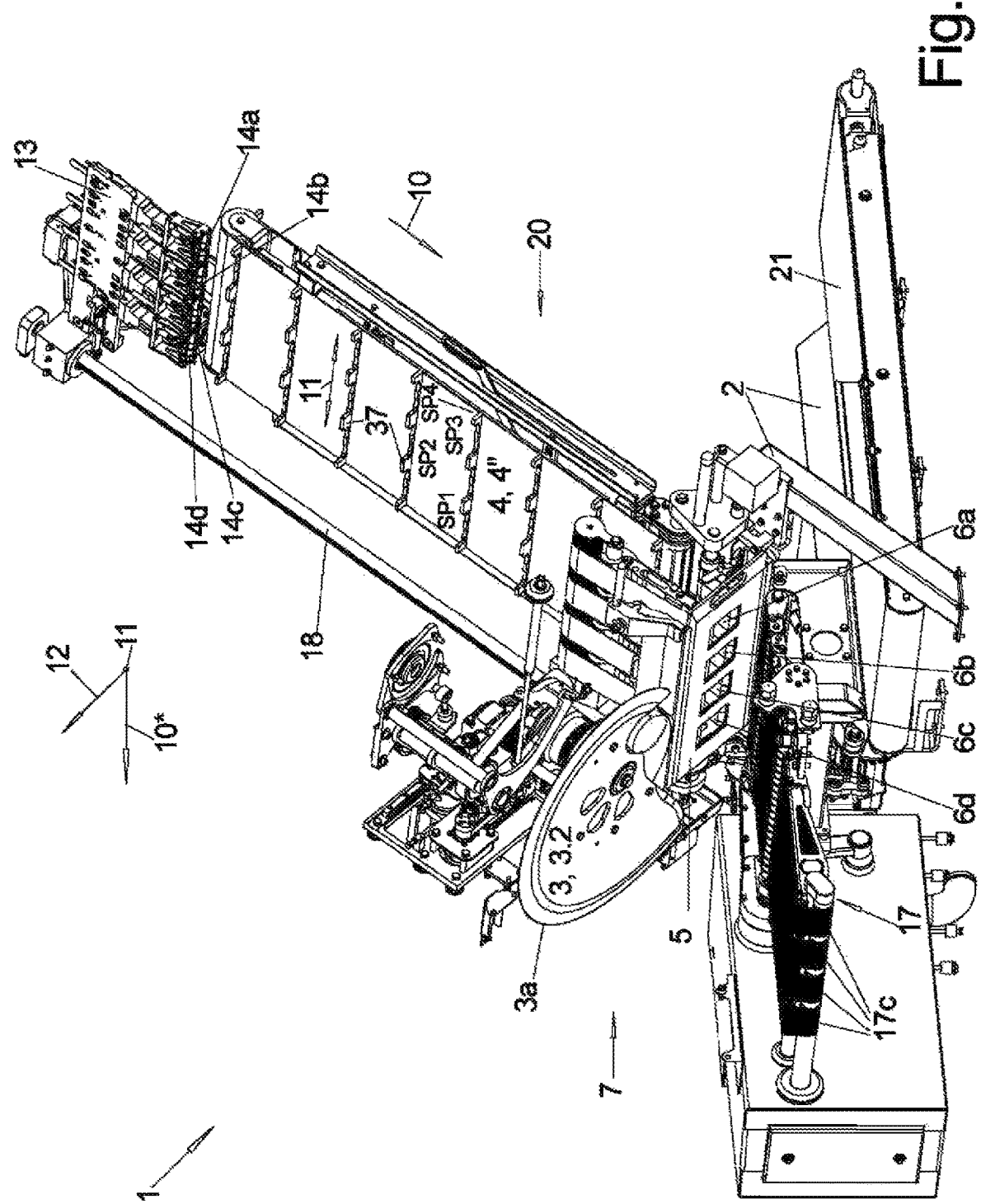

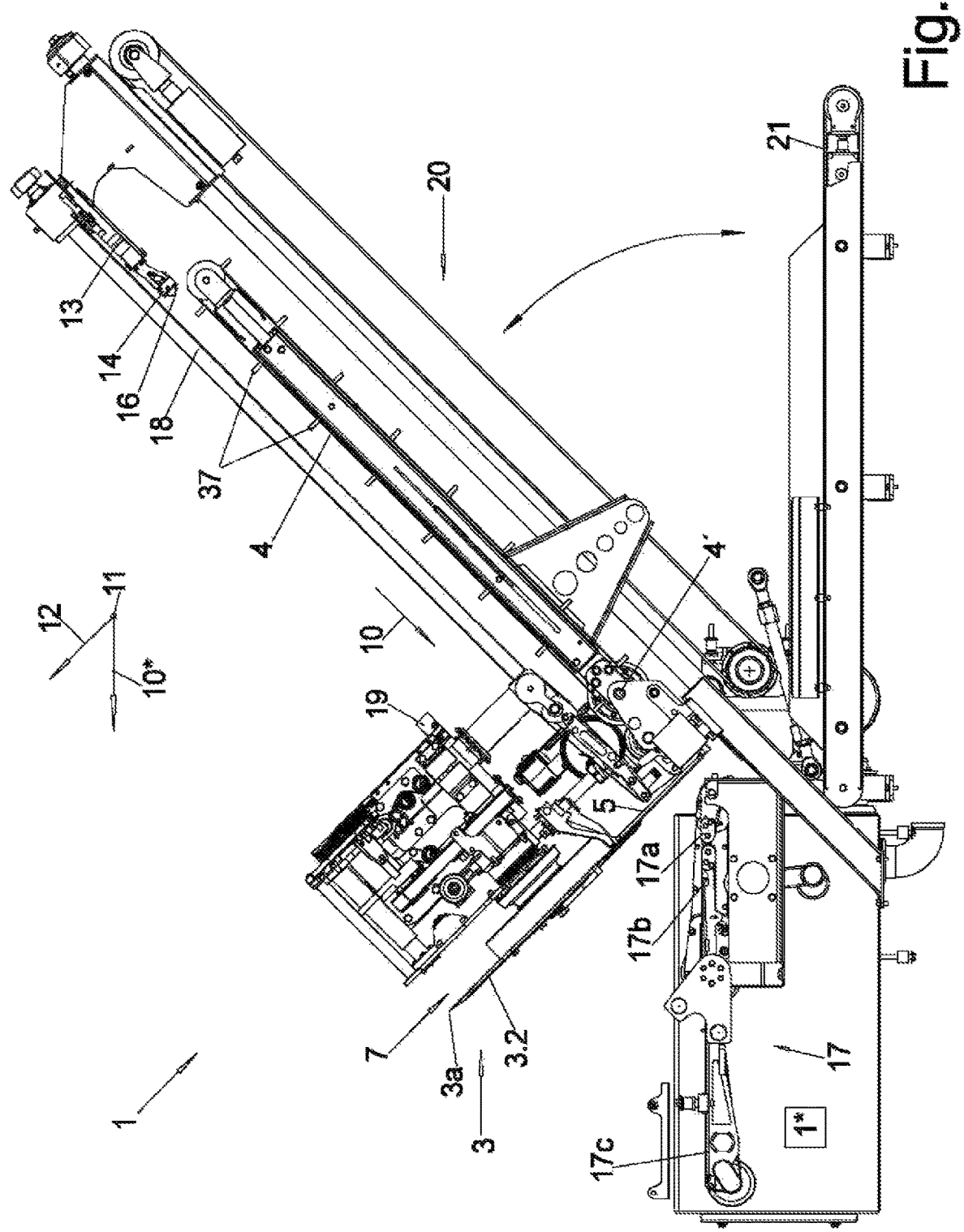

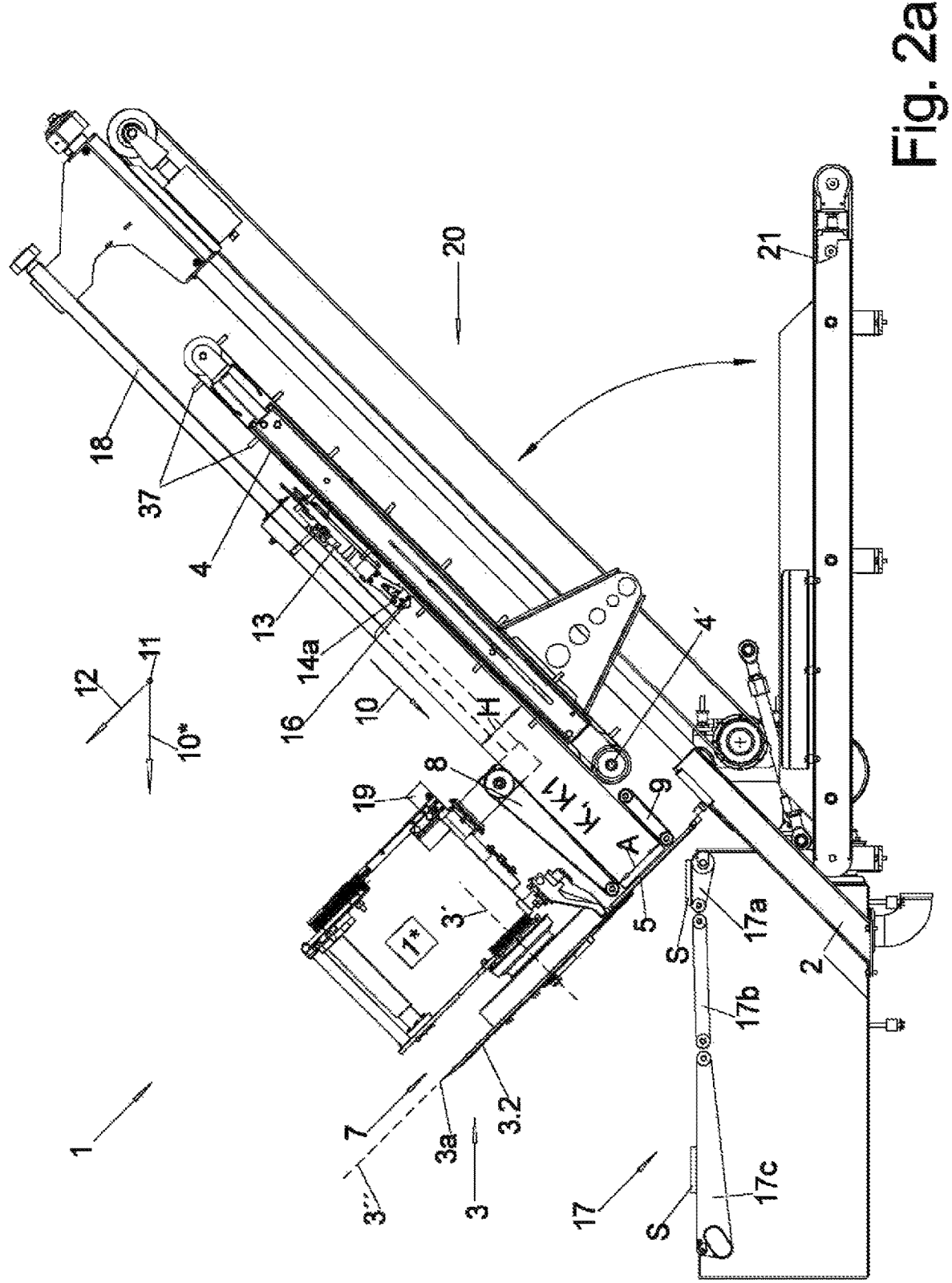

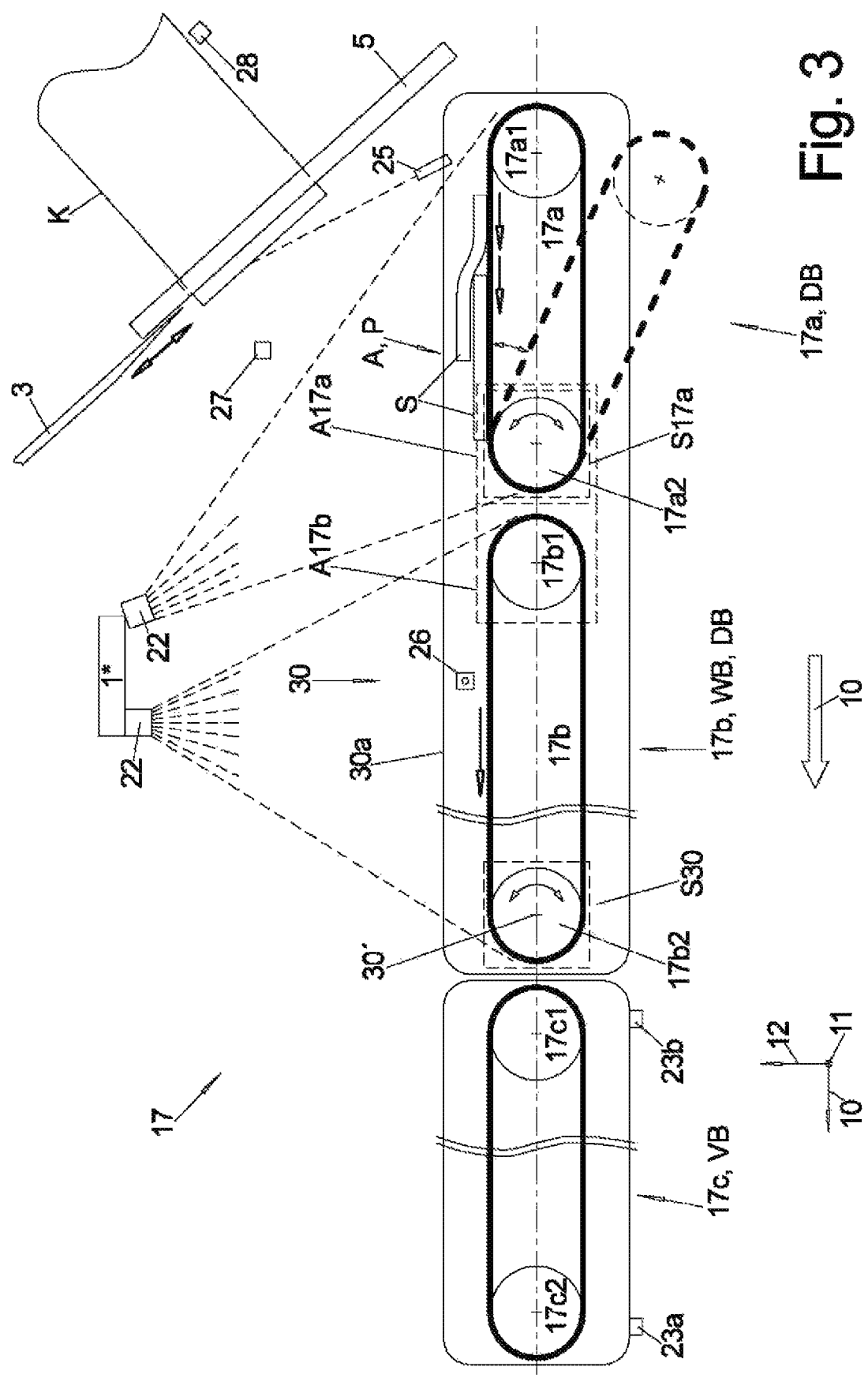

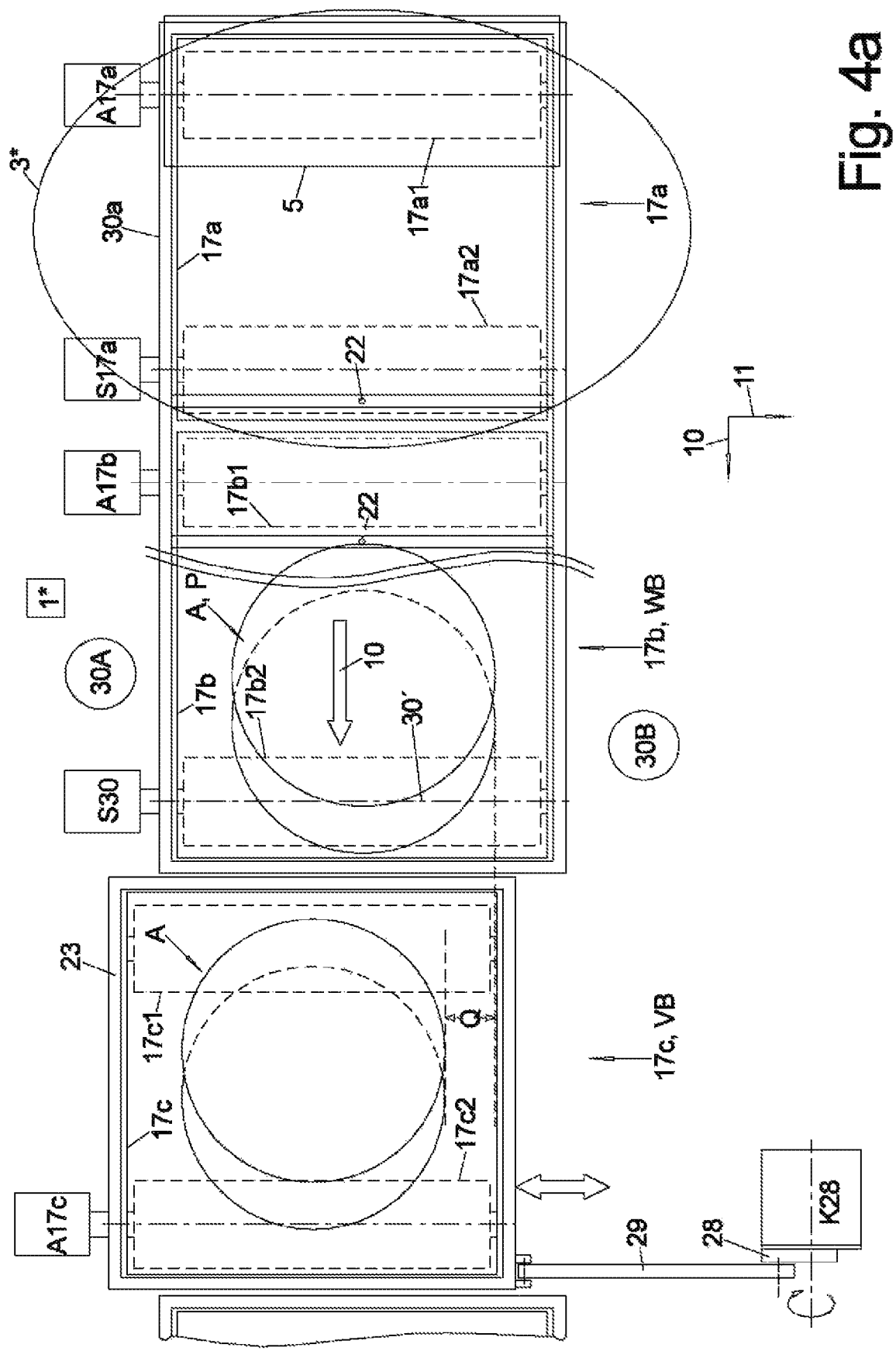

METHOD FOR POSITIONING AN ARTICLE TO BE TRANSPORTED AND DEVICE FOR CARRYING OUT THE METHOD

CROSS-REFERENCE TO RELATED APPLICATION

This application claims priority to German Patent Application No. DE 10 2020 130 342.4 filed on Nov. 17, 2020, the disclosure of which is incorporated in its entirety by reference herein.

TECHNICAL FIELD

The invention relates to slicing machines, in particular so-called slicers, which are used in the food industry to slice strands of an only slightly compressible product such as sausage or cheese, and in particular to their discharge unit, by means of which the sliced slices or shingled or stacked portions assembled therefrom are discharged from the cutting unit.

BACKGROUND

Since these strands can be produced with a cross section that is well shaped and dimensionally stable over their length, i.e., essentially constant, they are called product calibers or just calibers. For the purposes of the present application, however, the term caliber is intended to cover both such strands with a constant cross section over their length and those with a non-constant cross section.

In most cases, several product calibers are cut simultaneously in several tracks next to each other by cutting one slice each at a time from the same blade, which moves in a cross direction to the longitudinal direction of the product calibers.

The product calibers are pushed forward by a feed conveyor in the direction to a cutting unit and its blade, usually on an slanted downwardly directed feed conveyor, and are guided in each case through the product openings of a so-called cutting frame, at the front end of which the part of the product caliber protruding beyond this is cut off as a slice by the blade directly in front of the cutting frame.

The articles, i.e., individual slices or portions, generally fall onto a discharge unit by means of which they are transported away from the cutting unit and from there are usually transferred to a further conveyor which transports the articles to the next processing station, often an insertion machine for inserting the articles into the cavity of a thermoforming belt or individual trays.

Since the articles must have a correct rotational position as seen from above—unless they are individual round slices—as well as a correct transverse position in order to be completely positioned in the cavity, it is known to correct the position of the articles if necessary.

The later such a detection takes place in the passage direction, the better the optical accessibility for a camera, but the correction can also only be carried out at a correspondingly late stage, which undesirably increases the overall length of the machine because of an additional conveyor that may be required for this purpose.

For this purpose, it is first necessary to detect the actual position of the articles, which is possible, for example, in a non-contact manner by means of a camera, in particular a digital camera, directed at the discharge conveyor unit from above. This is known, for example, from WO 2004/000512 A1, which is coupled to the control of the machine referring their signals for controlling the moving parts of the machine.

In this context, a camera is to be understood as any unit operating without a guide, in particular an optical unit, which is possible to determine the actual position of the articles on a support surface, in particular a conveyor.

The upstream, first belt of the discharge unit, the so-called portioning belt, is very short in order to keep its mass low, since it must be intermittently accelerated and decelerated very quickly between the impact of the slice of a portion.

In addition, in some machines, each belt of the discharge unit, for example the portioning belt, comprises several individual belts lying next to each other in the transverse direction, which can be individually controlled, in order to be able to control the slicing on the individual tracks individually.

In this context, a belt or conveyor is to be understood as any type of conveyor in which the articles are moved lying on a movable support surface by the movement of this support surface, being an endless conveyor belt of a belt conveyor deflected around at least two deflecting pulleys, or instead many endless conveyor straps of a strap conveyor lying at a small transverse distance from one another, or individual slides that can be moved in particular independently of one another, or other types of conveyors.

SUMMARY

It is therefore the object of the invention to provide a method which solves this problem without increasing the overall length of the slicing machine and to provide a slicing machine, in particular a slicer, which is capable of carrying out this method.

With regard to the method, this object is solved in that the actual position of the article on the discharge unit is not only detected, preferably without contact, for example optically by means of a camera, but subsequently this actual position is also automatically compared with a predetermined target position and, in the event of an unacceptably high deviation from the target position, is automatically shifted to the target position, specifically by means of the part, in particular the conveyor of the discharge unit, on which the article rests.

As a result, the article has its target position at the end of the discharge unit at the latest, so that downstream of the discharge unit-regardless of whether this is an independent unit or part of the slicing machine-further conveyors are only required to move the articles to the next processing station, but no conveyors that can additionally perform a position change.

This keeps the length of the slicing machine low up to and including reaching the correct actual position of the articles.

Preferably, for the same reason, the actual position of the article is carried out, if required, either directly on the belt on which the detection of its actual position was also carried out, i.e., the detection belt, or on the belt or conveyor downstream thereof, and in particular immediately downstream thereof. This also promotes the reduction of the underlying.

It should be taken into account that in most cases one of the conveyors of the discharge unit is a weighing conveyor, and a weighing conveyor should generally not be used to change the actual position of the article lying on it in the transverse direction.

Thus, if a discharge unit comprises only three conveyors, namely a portioning belt, a discharge belt and a transfer belt to the next assembly, the target position can still be achieved within the discharge unit despite this embodiment of the second belt immediately following the portioning belt, the discharge belt, as a weighing belt, in that at least the transfer belt following the weighing belt is embodied as a displacement belt for displacing the article from the actual position to the target position, at least in the transverse direction.

To achieve this, it is advantageous to carry out the detection of the actual position as far upstream as possible, preferably directly on the portioning belt. The position correction can then be carried out either on the immediately following second belt, if this is not a weighing belt, or on the third belt, if the second belt is a weighing belt.

Due to the inclination of the portioning belt towards the overhanging cutting frame, it may be difficult for a camera to view it.

Depending on the job and the inclined position of the portioning belt or in general, it may therefore be better to detect the actual position on the second belt, i.e., the belt after the portioning belt, especially if this is a weighing belt, because then this belt and thus the article thereon is generally stationary for a short time for the purpose of weighing, so that during this standstill a particularly accurate detection of the actual position in the transverse direction and/or with regard to the rotational position viewed in the top view is possible. Then, however, the position correction should be carried out on the immediately following then third and often also last belt of the discharge unit.

If the actual position is to be determined, for example by means of a camera, either on the first belt or on the second belt, then either two cameras are required, and it must be possible to switch from one to the other, or instead a switchable deflecting mirror is required in the beam path between the camera, in particular the only camera, and the discharge unit.

Since detection of the actual position on the portioning belt is also difficult because, on the one hand, the portioning belt can oscillate until the last slice of a portion hits it and, on the other hand, moving parts such as the approaching slice can reach into the beam path of the camera until the last slice is deposited, it can be useful to carry out the scanning, in particular optical scanning, not from above but from below.

This can be achieved, for example, with the aid of a transparent belt and a camera positioned under the upper run, preferably between the upper run and the lower run of the positioning belt, whereby a so-called line scanner is also well suited for this purpose, whose light-receiving surface is very long and narrow, in particular only one pixel width narrow, and can extend with its main direction of extension transversely under the upper run of the positioning belt.

All these solutions allow a reliable detection of the actual position and a position correction before the end of the discharge conveyor.

Often the actual position of the article is not in the target position with regard to the rotational position viewed from the top.

Then the rotational position is corrected, for example by driving parts of the belt, in the case of a strap conveyor only some straps thereof, at a different speed to the rest of the belt, whereby the article lying on it can be rotated by an angle of rotation about an upright axis.

Especially if the actual position has to be changed with respect to the transverse position as well as with respect to the rotational position, belt conveyors consisting of a plurality of narrow straps lying next to each other and drivable separately controlled for the change of the rotational position are preferably suitable for this purpose, if the downstream deflecting pulleys for these belts can be displaced—at least jointly, ideally individually controlled—in transverse direction so that they run inclined to the general passage direction through the machine and can thus also displace the article in transverse position, at least by a part of the transverse distance between the two deflecting pulleys.

Since an incorrect actual position is usually caused by the cutting process, it is desirable to determine the cause of the deviation from the target position, and preferably to determine it automatically, instead of spending a lot of time on manual determination or try-and-error position correction.

According to the invention, the cause is therefore deduced from the type and degree of deviation from the target position, for which the control of the machine must be embodied, which is possible in particular if the control contains artificial intelligence.

Depending on the determined cause, the control can then change the causal parameter.

For example, a cutting surface on the blade that has become radially too long due to regrinding can cause the cut-off slice to adhere too long to the blade and thus be ejected in a slightly wrong direction.

The same can be the case if the material of the slice adheres too strongly, for example because the temperature of the slice is too high or the flexibility of the slice is too low.

In this case, or in the case of other causes, the control can either automatically change the speed of the blade or ask the operator to change the blade and, in particular, to prescribe a different design for the new blade and/or to ask for one or more of the product parameters of the next calibers to be sliced to be changed.

In this way, it is also possible to memorize from each cutting situation the parameters that have led to a correct actual position, and to refer back to these parameters from the beginning for the same or similar new cutting job.

In order to be able to draw such conclusions, it is important that as many as possible of the machine parameters on the machine side as well as the caliber parameters on the product side are known or determined, and therefore the corresponding sensors must be available on the machine for the determination if such an automatic cause determination is to be carried out.

This can greatly reduce the dead times of the machine, in particular the setting time of the machine for a new product.

A correct actual position of the slice is particularly difficult to achieve if the slice is not deposited lying in one plane, but is deposited as a folded slice, which is known to be achieved by arranging a rotating folding shaft in the falling path of the separated slice, which can not only rotate during the falling of the slice, but also change its position in the process.

In this case, if the actual shape of the folded slice is found to deviate from the target shape, especially if the deviation is in the shape of the fold, the speed of the folding shaft and/or the position or path of the folding shaft are automatically changed during the folding process if a predetermined acceptance value is exceeded. This can also be a change in the path of the folding shaft over part of the time or the entire time of the folding process.

Preferably, in a multi-track slicing machine, this is done separately for each track if separately controllable folding shafts are available.

In this way, a time-consuming manual try and error search for the correct folding process is avoided.

With regard to the slicing machine with the known basic components of cutting unit, feed unit for calibers, discharge unit for conveying the slices or portions—which, as is known, comprises at least one further conveyor in addition to the portioning belt—and with the additional presence of a camera for detecting the actual position of the slice or portion on the discharge unit, the control system of the machine, which is always present, must be embodied and intended to carry out the aforesaid method in order to achieve the advantages set out for the process.

Preferably, the camera for detecting the actual position is directed to the first and/or the second belt of the discharge conveyor unit, to the second belt preferably if it is a weighing belt.

If the second belt is not a weighing belt, the camera can either be directed to the portioning belt and the second belt is already embodied as a displacement belt for changing the position of the article, or the camera is directed to this second belt and by means of this belt, which is embodied as a change belt, the change of position of the article is also carried out immediately.

The camera is preferably arranged above the respective belt, but in special situations it could also be arranged below the upper run, which must then preferably be transparent, and in particular be embodied as a camera with only a small extension in the passage direction, in particular as a line camera.

The embodiment as a line camera is preferably useful if the displacement belt is not the detection belt, but a downstream belt.

Preferably, the slicing machine has sensors that are data-connected to the control.

The sensors should be able to detect machine parameters, e.g., the speed of the blade and/or the position of the blade axis in the two transverse directions to the passage direction and/or the circumferential contour of the blade and/or the cutting angle of the blade and/or the radial length of the cutting surface of the blade.

Sensors can also be present to determine caliber parameters, preferably upstream of the blade unit, for example the core temperature of the caliber and/or the surface temperature of the caliber and/or the bending stiffness of the caliber, in particular about a bending axis lying in the first transverse direction and/or the salt content of the caliber and/or the electrical conductivity of the caliber, which can be derived from its water content.

For transverse displacement, a displacement belt can be positioned in a belt cassette which is controlled as a whole and can be displaced transversely, preferably by means of a simple crank drive, in the transverse direction.

Another possibility is that the belt is a strap conveyor whose downstream deflecting pulleys are transversely displaceable, preferably individually and independently of each other, whereby the transverse position of an article transported thereon can be changed.

If the running speed of the belts can also be controlled individually and independently of each other, the rotational position of the article lying on it can also be changed.

If the slicing machine comprises a folding unit with a folding shaft which can be displaced in a controlled manner as well as rotated, the camera should be embodied and arranged in such a way that it is also able to determine the folding shape of the folded slice and the control should be embodied in such a way that it can compare this folded actual shape with a folded target shape, which can be solved in particular by means of artificial intelligence in the control.

Based on the determined discrepancy, the control can then-if the discrepancy is above a predetermined acceptance value-automatically control the folding shaft differently during the folding process so that the actual shape then corresponds to the target shape.

Preferably, the folding unit should be embodied separately for each path in a multi-path slicing machine.

BRIEF DESCRIPTION OF THE DRAWINGS

Embodiments according to the invention are described in more detail below by way of example. They show:

FIG. 1a, b: a slicing machine in the form of a slicer according to the prior art in different perspective views, FIG. 1c: the slicing machine of FIG. 1a, b in side view, FIG. 2a: a simplified vertical longitudinal section through the slicing machine of FIGS. 1a-c, i.e., in the same viewing direction as FIG. 1c, in which the various conveyor are more clearly visible, with the feed belt tilted up into the slicing position, FIG. 3: a side view of a discharge unit according to the invention, FIG. 4a, b: two different embodiments of a unit according to the invention as seen from above.

FIGS. 1a, 1b show different perspective views of a slicer 1 for simultaneous slicing of several product calibers K side by side—shown only in FIG. 2a, b—and depositing them in shingled portions P each consisting of several slices S, or only individual slices S, as shown in FIG. 2b, with a general passage direction 10* through the slicer 1 from left to right, and FIG. 1c shows a side view of this slicer 1.

FIG. 2a shows a vertical section through such a slicer 1 with the same viewing direction as FIG. 1c, which is easier to understand by omitting the side covers.

Figure 1B:
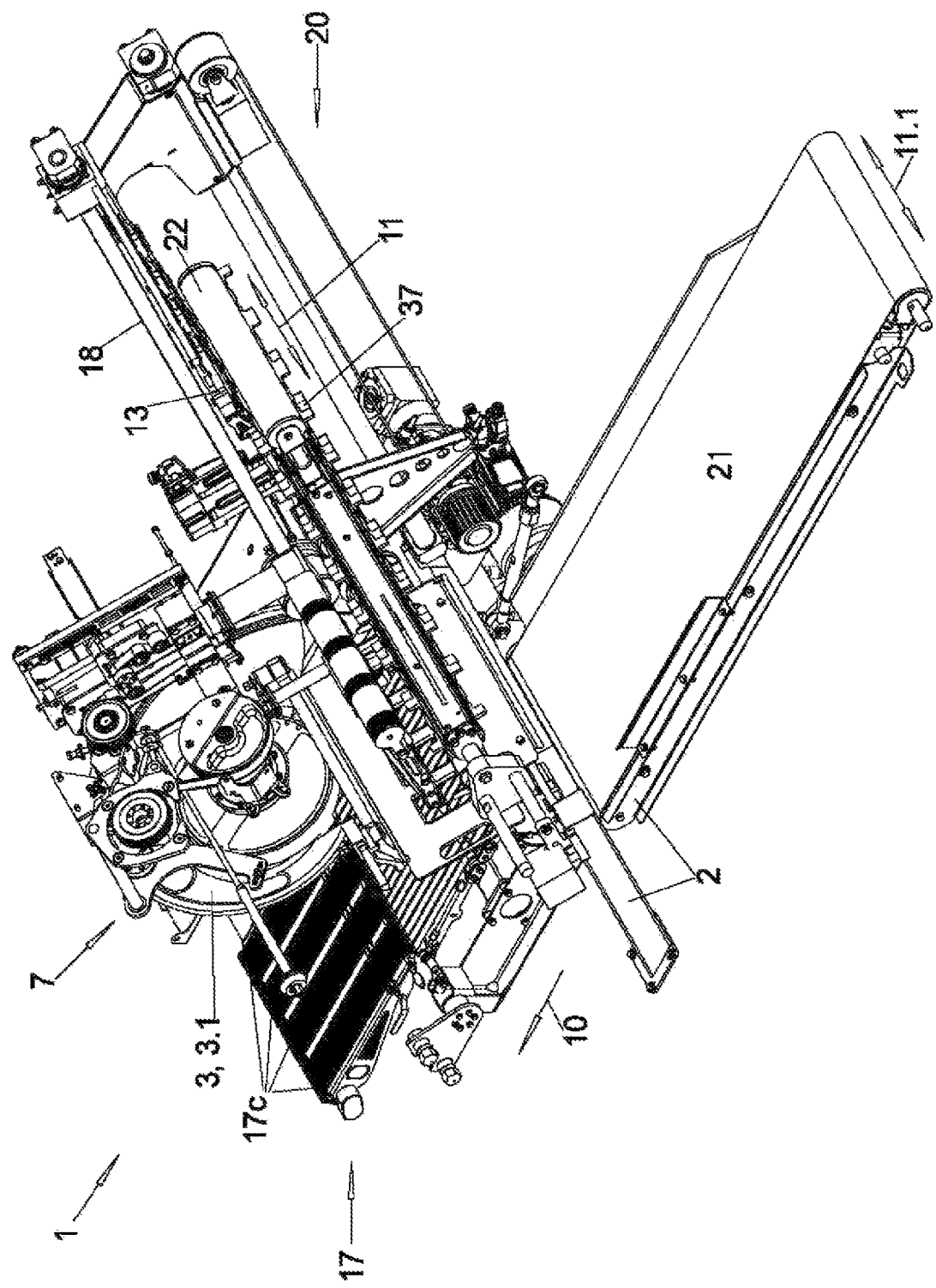

The basic structure of the slicer 1 is that to a cutting unit 7 with a rotating sickle blade 3 are fed, in this case, four product calibers K lying next to each other transversely to the feeding direction 10 by a feed unit 20, from the front ends of which the rotating sickle blade 3 cuts off a slice S in each case during one revolution, i.e., quasi simultaneously.

The feed unit 20 comprises a feed conveyor 4 in the form of an endless, circulating feed belt 4, the upper run of which can be driven at least in the feeding direction 10, and preferably also in the opposite direction. The calibers K rest on the feed belt 4 and are positioned in the transverse direction 11 by spacers 15 which project radially outwards from the feed belt 4.

Figure 2B:
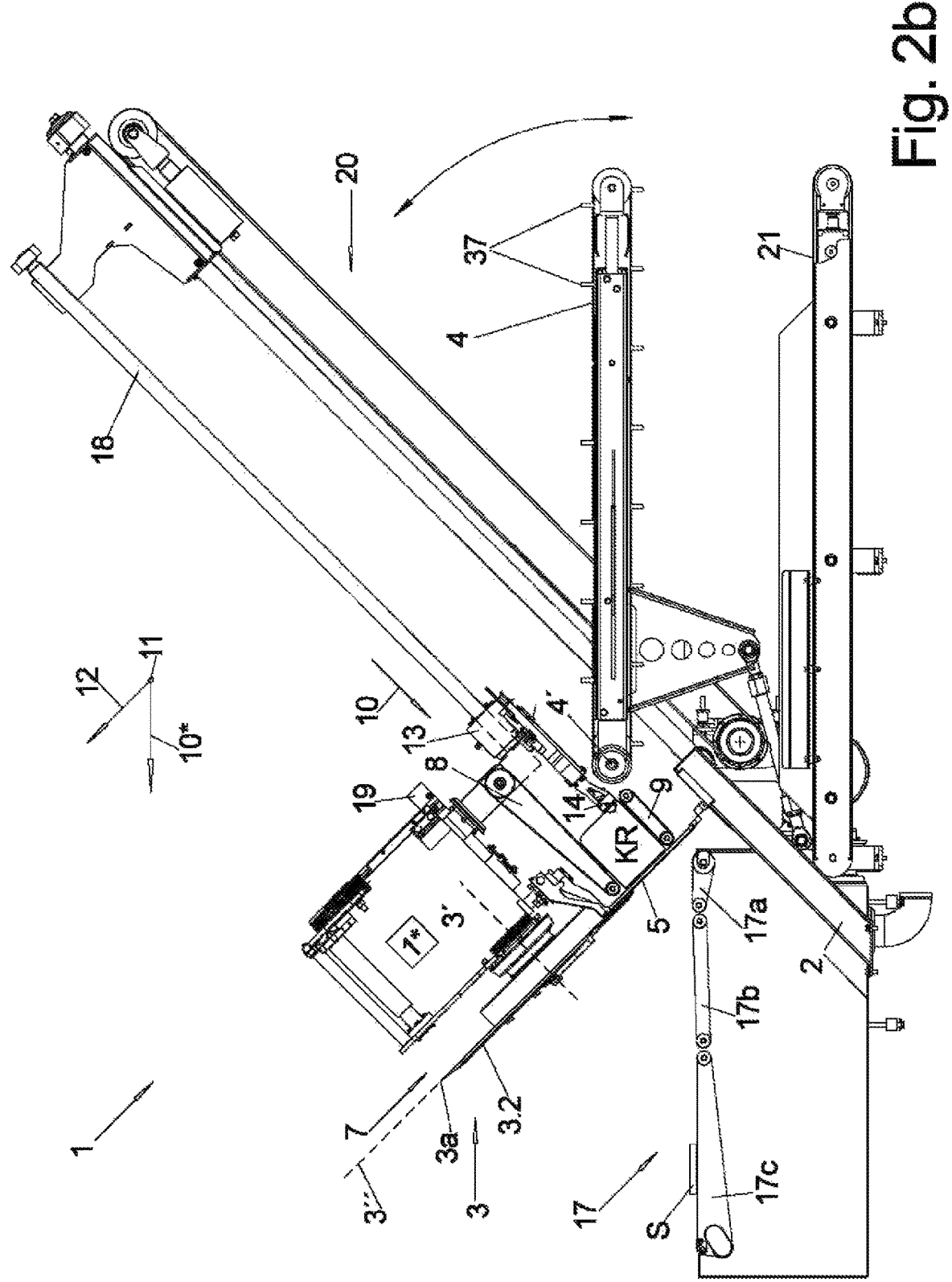
FIG. 2b: a longitudinal section as in FIG. 2a, but with the infeed belt tilted down into the loading position and the product caliber in an advanced state of cutting.

For cutting the product calibers K, the feed conveyor 4 is in the inclined position shown in FIGS. 1a-c and FIG. 2a with a low-lying front end on the cutting side and a high-lying rear end, from which it can be tilted down about a pivot axis 20' running in its width direction, the 1st transverse direction 11, and located in the vicinity of the cutting unit 7, into an approximately horizontal loading position as shown in FIG. 2b.

The rear end of a caliber K lying in the feed unit 20 is in each case held form-fit by a gripper 14a-d with the aid of gripper claws 16. These grippers 14a-14d are attached to a common gripper unit 13, which can be moved along a rod-shaped gripper guide 18 in the feed direction 10.

Both the feed of the gripper unit 13 and the feed conveyor 4 can be driven in a controlled manner, but the actual feed speed of the calibers K is effected by a so-called upper and lower driven product guide 8, 9, which engage on the upper and lower sides of the calibers K to be cut open in their front end regions near the blade unit 7:

The front ends of the calibers K are each guided through a product openings 6a-d provided for each caliber, which are formed in a plate-shaped cutting frame 5. Immediately in front of the front end face of the cutting frame 5, which points obliquely downwards, runs the cutting plane 3", in which the sickle blade 3 rotates with its cutting edge 3a and thus cuts off the projection of the calibers K from the cutting frame 5 as a slice S. The cutting plane 3" is defined by the cutting edge 3a. The cutting plane 3" is spanned by the two transverse directions 11, 12.

Here, the inner circumference of the goggle openings 6a-d of the cutting edge 3a of the blade 3 serves as a counter cutting edge.

Frequently, the two product guides 8, 9 in the 1st transverse direction 11 are separate for each caliber K and can be controlled separately.

The upper product guide 8 can be displaceable in the 2nd transverse direction 12—which is perpendicular to the surface of the upper run of the feed conveyor 4 tilted up into the cutting position—for adaptation to the height H of the caliber K in this direction. Furthermore, at least one of the product guides 8, 9 can be embodied so as to be pivotable about one of its deflecting pulleys 8a, 8b, 9a, 9b, in order to be able to change to a limited extent the direction of the conveyor belt resting against the caliber K.

The slice S, which is at an angle in space and has just been cut off, falls onto a discharge unit 17 starting below the cutting frame 5, which in this case consists of several discharge conveyors 17a, b, c arranged one behind the other with their upper runs approximately aligned in the passage direction 10*.

Below the feed unit 20 there is an approximately horizontally running end piece conveyor 21, also in the form of an endlessly circulating conveyor belt, which starts with its front end below the cutting frame 5 and directly below or behind the discharge unit 17 and with its upper run transports end pieces falling on it to the rear against the passage direction 10*.

Therefore, at least the first conveyor 17a in passage direction 10* can be driven with its upper run against the passage direction 10*, so that an end piece falling thereon, for example, can be transported to the rear and falls onto the lower-lying end piece conveyor 21.

FIG. 3 shows in side view only the discharge unit 17 of the slicing machine 1 in an embodiment according to the invention:

In the transport direction 10 in which the articles A—here a portion P consisting of only two shingled slices S—are to be conveyed away, there are three discharge conveyors 17a, b, c in succession, in each case endlessly circulating belts, which circulate via an upstream deflecting pulley 17a1, 17b1, 17c1 and a downstream deflecting pulley 17a2, 17b2, 17c2 in the transport direction 10 and on the upper runs of which the article A rests for transport and transfer to the next conveyor. In reality, the second and third conveyors 17b, 17c are considerably longer in the transport direction 10 than the first conveyor 17a.

As shown in the area on the right, the overhang of the caliber K projecting downward from the inclined cutting frame 5 is cut off by means of the blade 3, which is moved closely along the underside of the cutting frame 5, and the slices S fall one after the other onto the portioning belt 17a, which is moved one step by step after each slice S has impacted to produce a shingled portion P in the longitudinal direction, the transport direction 10.

Once the article A to be produced, in this case the portion P, has been produced on the portioning belt 17a, the latter is set in motion and the article A is transferred to the subsequent discharge belt 17b, which in this case is embodied as a weighing belt WB and encloses a scale, not shown, in order to weigh the article A thereon, for which purpose the discharge belt 17b is generally stopped briefly.

Thereafter, by driving the discharge belt 17b, the article A is transferred to the next belt, the transfer belt 17c, whose main task is to transfer the article A to a subsequent conveyor of another processing unit.

As can be seen, the first two conveyors 17a, 17b are usually mounted and supported in a pivot unit 30, usually in its pivot frame 30a, which is usually pivotable about a pivot axis 30' arranged near its downstream end—which here coincides with the rotation axis of the downstream deflecting pulley 17b2 of the discharge conveyor 17b—in order, in particular, to determine the angle and the distance in height of the portioning belt 17a relative to the cutting frame 5 and thus the drop distance for the slices S as required.

For the same reason, the portioning belt 17a is usually additionally pivotable about a pivot axis running in transverse direction 11, which is usually identical with the rotation axis of the downstream deflecting pulley 17a2 of the portioning belt 17a, relative to the pivot frame 30a.

The drive of the portioning belt 17a, i.e., of its conveyor belt, is realized via a drive motor A17a, which is arranged here coaxially on the rotation axis of the downstream deflecting pulley 17a2, and likewise coaxially thereto can be arranged the pivot motor S17a, which effects the pivoting of the portioning belt 17a relative to the pivot frame 30a.

The pivoting of the entire pivoting unit 30 is effected by means of a pivot motor S30, which is arranged coaxially to the pivot axis and thus to the downstream deflecting pulley 17b2, while the drive motor A17b for the conveyor belt of the discharge conveyor 17b is arranged coaxially to the other deflecting pulley 17b1 of the discharge conveyor 17b.

Figure 4B:
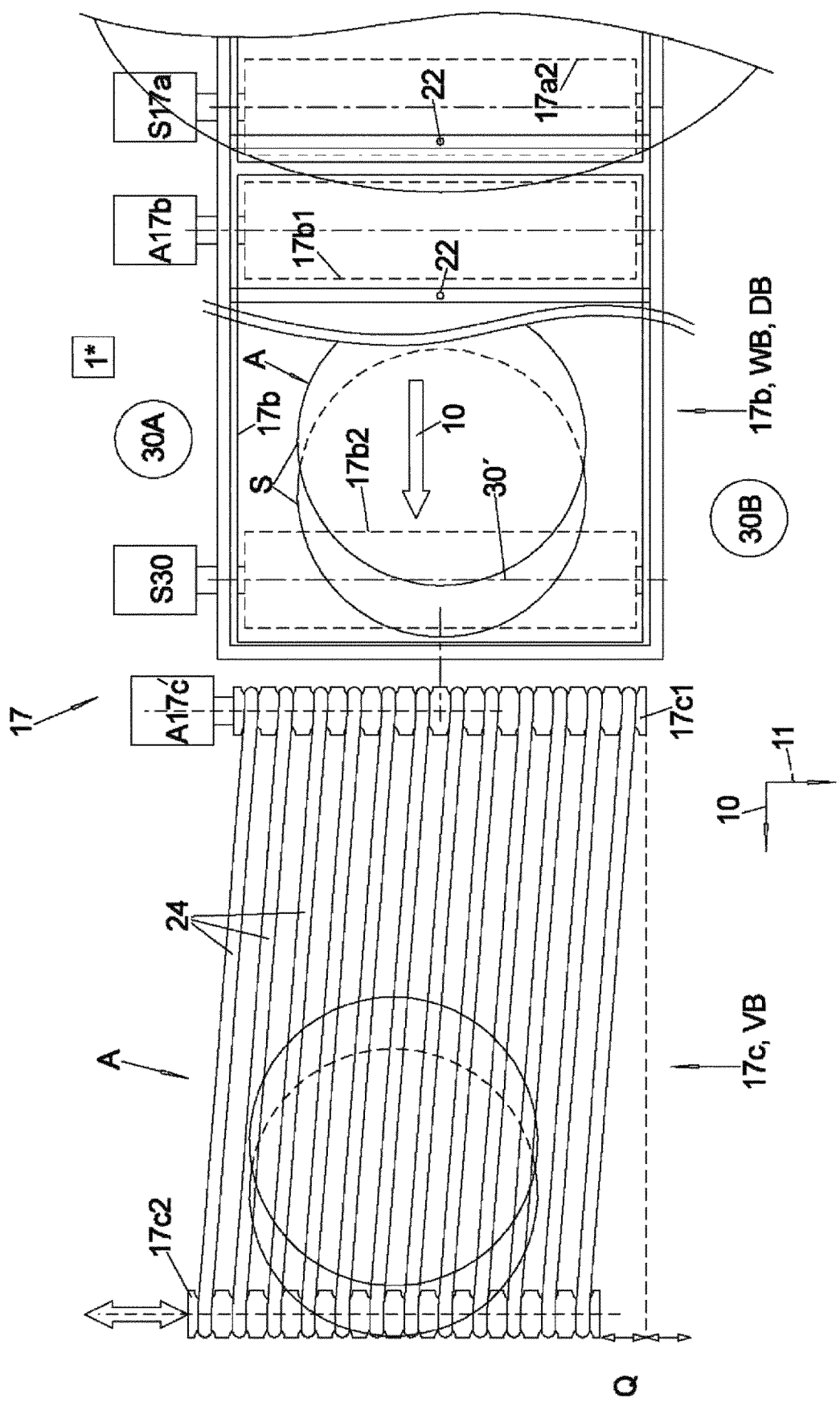

The special feature according to the invention consists first of all in the fact that a camera 22 is arranged above the discharge conveyor 17—two of which are shown in FIG. 3 at alternative positions—and which are data-connected with the control 1* of the slicing machine 1, and with which the actual position of the article A in transverse direction 11 on the respective belt 17a or 17b is to be recorded and detected, as can best be seen in the views of the alternative solutions of FIGS. 4a, 4b.

While a camera 22 which is to record this actual position on the discharge conveyor 17b, i.e., the middle of the three belts, can be arranged centrally above it, this is not possible in the case of detection on the portioning belt 17a because of the inclined overhanging cutting frame 5 and the blade 3—the flying circle 3* of which is drawn in FIG. 4a, b—so that such a camera 22 must be arranged above the downstream end or, in the transport direction 10, even downstream of the portioning belt 17a at the height above it.

Such a camera, which is shown here on the right, has a correspondingly inclined viewing angle of the portioning belt 17a, so when the latter is tilted down with its upstream end in order to reduce the angle between the cutting frame 5 and the upper run of the portioning belt 17a. This belt view complicates the evaluation and the accuracy of the evaluation of the actual position of the article A, which is why the middle belt, i.e., the discharge belt 17b, is preferably also used as detection belt DB for determining the actual position of the article thereon, especially if it is embodied as weighing belt WB.

In the event of a deviation of the actual position from the target position in transverse direction 11, in any case greater than a predetermined tolerance value, this actual position is corrected, as shown in FIG. 4a, by means of the last of the three belts of the discharge unit 17, the transfer belt 17c:

Its deflecting pulleys 17c1, 17c2 are mounted as a first solution in a so-called belt cassette 23, usually an enclosing frame as seen in plan view, and also the drive motor A17c for this conveyor belt is attached to this frame of the belt cassette 23.

The entire belt cassette 23 can be displaced in a controlled manner for a desired amount in the transverse direction 11, for example along guides 23a, b as shown in FIG. 3, which extend in the transverse direction 11, wherein a crank drive 28+29 can be used as the transverse drive with a crank 28 which, driven by a crank motor K28, can be pivoted about a crank axis 28' which extends transversely to the intended direction of displacement of the belt cassette 23, in this case the transverse direction 11. Between the belt cassette 23 on the one hand and the crank 28 on the other hand, there distanced to its ball axis 28', a connecting lever 29 is hinged with its ends.

If, therefore, as seen in the top view of FIG. 4a, the article A here in the form of a portion P, lay too far to the left in the transverse direction 11 on the transport direction 10 by a transverse distance Q, the belt cassette 23, as soon as the article A is located thereon, is moved by this transverse distance Q in the target transverse direction 11, so that the article A is located in the target position in the transverse direction 11 with respect to the base frame 2 of the slicer 1. In this transversely deflected position of the belt cassette 23, the article A is then transferred to an indicated subsequent transport unit.

The same aim is achieved with the second solution, also shown in a top view in FIG. 4b, in which the transfer conveyor 17c—only the downstream part of the portioning belt 17a is shown for reasons of space—is again used as a transfer belt VB, but in contrast to the belt conveyors of FIG. 4a, this last transfer conveyor 17c is a belt conveyor with, as seen in the top view, a plurality of straps 24 circulating side by side in the transverse direction 11 in respective vertical circulating planes, usually round straps with a round transverse section, wherein the deflecting pulleys 17c1, 17c2, spaced apart in the transverse direction 11, preferably have for each strap 24 a correspondingly embodied circumferential groove which positions the straps 24 in the transverse direction 11 and holds the strap 24 in the circumferential groove even if the rotation axis of the corresponding deflecting pulley is slightly inclined relative to the plane of rotation of the respective strap 24.

If the downstream deflecting pulley 17c2 can be moved in a controlled manner in the transverse direction 11—for which a crank drive 28+29, as described in FIG. 4a, can be used—an article A lying on the belt conveyor is not conveyed exactly in the conveying direction 10, but at a slight angle to it, as seen from above.

If the target position of the article A on the detection belt DB, here the middle discharge conveyor 17b, was different from the target position by the transverse distance Q, then for the correction of the position of the article the downstream deflecting pulley 17c2 is deflected in the corresponding direction by this transverse distance Q and remains in this position during the time in which the article A is on this transfer conveyor 17c.

As can be seen in FIGS. 4a and 4b, all the driving motors of the discharge unit 17 are arranged, if possible, on the drive side 30A facing away from the operator side 30B, where the operator of the slicer 1 is generally located and controls its operation.

Furthermore, the belt conveyor 17c shown in FIG. 4b can also be used to rotate an article A about the vertical axis in order to change its orientation to a target rotational position:

For this purpose, during transport along the strap conveyor 17c, the individual straps 24 are driven at different speeds—individually or in groups—in order to thereby rotate the article A lying thereon.

If, for example, the upper straps 24 shown in FIG. 4b, on which the right-hand edge of the article A in the conveying direction 10 rests, run faster than the lower straps 24, on which the left-hand edge of the article A rests, and the article A is rotated counterclockwise as a result.

In this case, however, a single drive motor A17c'—as shown—is not sufficient, e.g., for the entire driving of deflecting pulley e.g., 17c1, but the individual straps or groups of straps must be separately drivable for this purpose and have a separate drive motor for this purpose.

In addition, various sensors are shown in FIG. 3 in order to determine as many parameters as possible, preferably parameters relating to the caliber K. The sensors can also be used to measure the speed of the belt:

Thus, the temperature of the front surface of the caliber K to be cut can be measured by means of a sensor 25, which can be located, for example, on the base frame of the machine. Before the caliber K is cut, this is the surface temperature, and after the first centimeters have been cut off—if this is done quickly enough—it is the core temperature of the caliber K. The temperature influences the adhesion of the slices S to the blade 3 and also the bending stiffness of the slices and thus also the shape of the slice S when it hits the portioning belt 17a and in particular the result of the slice folding process, if such a process is carried out.

For this purpose, a sensor 26, whose measuring direction is an approximately horizontal transverse direction, can detect the shape of the fold of a folded slice lying on the, in this case, middle conveyor 17b and compare it with a target shape of a folded slice.

With the same viewing direction, a sensor 27 with its detection direction in transverse direction 11 can be arranged just below the cutting frame 5 in the falling path of the slices S, which detects the bending of the falling slices in the side view, from which the bending stiffness of the slice S can also be concluded.

In order to determine the salt content of the caliber and/or the electrical conductivity of the caliber and from this the water content, a sensor 28 contacting the caliber K is usually necessary, which can be arranged in the feed unit 20 for the calibers K, for example in the gap between the driven lower product guide 9 and the feed conveyor 4, which however are not shown in FIG. 3.

REFERENCE SIGN LIST 1 slicing machine, slicer
1* control
2 base frame
3 blade
3 rotation axis 3″ blade plane, cutting plane
3* flying circle
3a cutting edge
4 feed conveyor, feed belt
5 cutting frame
6a-d product opening
7 cutting unit
8 upper product guide, upper guide belt
9 bottom product guide, bottom guide belt
10 passage direction, transport direction
10* pass through direction
11 first transverse direction (width slicer)
12 second transverse direction (height-direction caliber)
13 gripper unit, gripper slide
14,14 a-d gripper
15 spacer
15′ support surface
16 gripper claw
17 discharge unit
17a portioning belt
17b, c discharge conveyor, discharge belt
17a1, 17a2 deflecting pulley
17b1, 17b2 deflecting pulley
17c1, 17c2 deflecting pulley
18 gripper guide
19 height sensor
20 feed unit
21 end piece conveyor
22 camera
23 belt cassette
23a, b guide
24 strap
25 sensor
26 sensor
27 sensor
28 crank
28′ crank axle
29 connecting lever
30 pivot unit
30′ pivot axis
30a pivot frame
A article
K product, product caliber
KR end piece
S slice
P portion
Q transverse distance
DB detection belt
VB displacement belt
WB weighing belt
A17a, b, c drive motor
K28 crank motor
S17a, c pivot motor

The invention claimed is:

1. A method for positioning an article in a slicing machine having a discharge unit, the method comprising:
detecting an actual position of the article on the discharge unit by an optical unit, wherein the optical unit is data-connected with a control of the slicing machine,
automatically comparing the actual position with a predetermined target position for the article by the control, and
in the event of a discrepancy between the actual position and the predetermined position, automatically displacing the article to the predetermined target position by a belt of the discharge unit on which the article rests, wherein
a transverse position of the article is changed by a transverse distance by moving the belt of the discharge unit on which the article rests, and
a rotational position of the article about a vertical axis is changed by driving a plurality of straps of the belt of the discharge unit at different speeds,
wherein the belt is a displacement belt and the plurality of straps are controllable individually and independently of one another regarding running speed and deflectable pulleys displaceable individually and independently of one another in the transverse direction.

2. The method according to claim 1,
wherein
the detecting of the actual position takes place without contact with the article.

3. The method according to claim 1,
wherein the target position comprises a target transverse position and/or a target rotational position and/or a target longitudinal position, and wherein
the control recognizes or determines a cause of deviation of the article from the target transverse position and/or the target rotational position and/or the target longitudinal position based on a degree of the deviation from the target transverse position and/or the target rotational position and/or the target longitudinal position and automatically eliminates the cause by
changing a speed of a blade of the slicing machine and/or
changing the blade for a differently embodied blade and/or
changing one or more product parameters before slicing a caliber.

4. The method according to claim 3,
wherein, to determine the cause of the deviation, parameters relating to a cutting process are determined or made available to the control, wherein the parameters comprise
machine parameters including
speed of the blade and/or
position of a blade axis in its transverse directions relative to a cutting frame and/or
circumferential contour of the blade and/or
cutting angle of the blade and/or
radial length of a cutting surface of the blade
and/or
caliber parameters including
core temperature of the caliber and/or
surface temperature of the caliber and/or
bending stiffness of the caliber and/or
salt content of the caliber and/or
electrical conductivity of the caliber.

5. The method according to claim 1, wherein the article comprises a slice or a portion of several shingled or stacked slices.

* * * * *